United States Patent
Kriss et al.

(10) Patent No.: US 10,387,074 B2
(45) Date of Patent: Aug. 20, 2019

(54) EFFICIENT USE OF BUFFER SPACE IN A NETWORK SWITCH

(71) Applicant: Mellanox Technologies TLV Ltd., Raanana (IL)

(72) Inventors: Roy Kriss, Netanya (IL); Barak Gafni, Campbell, CA (US); George Elias, Tel Aviv (IL); Eran Rubinstein, Hod Hasharon (IL); Shachar Bar Tikva, Petah Tikva (IL)

(73) Assignee: Mellanox Technologies TLV Ltd., Raanana (IL)

( * ) Notice: Subject to any disclaimer, the term of this patent is extended or adjusted under 35 U.S.C. 154(b) by 182 days.

(21) Appl. No.: 15/161,316

(22) Filed: May 23, 2016

(65) Prior Publication Data

US 2017/0337010 A1    Nov. 23, 2017

(51) Int. Cl.
*H04L 12/933* (2013.01)
*G06F 3/06* (2006.01)
(Continued)

(52) U.S. Cl.
CPC ............ *G06F 3/0656* (2013.01); *G06F 3/061* (2013.01); *G06F 3/067* (2013.01); *G06F 3/0631* (2013.01);
(Continued)

(58) Field of Classification Search
CPC . H04L 2012/5679; H04L 47/30; H04L 47/10; H04L 47/32; H04L 49/10;
(Continued)

(56) References Cited

U.S. PATENT DOCUMENTS 6,108,713 A    8/2000  Sambamurthy et al.
6,178,448 B1   1/2001  Gray et al.
(Continued)

FOREIGN PATENT DOCUMENTS

EP    1720295 A1    11/2006
EP    2466476 A1     6/2012
(Continued)

OTHER PUBLICATIONS

Cisco Systems, Inc.,"Advantage Series White Paper Smart Buffering", 10 pages, 2016.
(Continued)

*Primary Examiner* — Jae Y Lee
*Assistant Examiner* — Aixa A Guadalupe Cruz
(74) *Attorney, Agent, or Firm* — Kligler & Associates

(57) ABSTRACT

Communication apparatus includes multiple ports configured to serve as ingress ports and egress ports for connection to a packet data network. A memory is coupled to the ports and configured to contain both respective input buffers allocated to the ingress ports and a shared buffer holding data packets for transmission in multiple queues via the egress ports. Control logic is configured to monitor an overall occupancy level of the memory, and when a data packet is received through an ingress port having an input buffer that is fully occupied while the overall occupancy level of the memory is below a specified maximum, to allocate additional space in the memory to the input buffer and to accept the received data packet into the additional space.

20 Claims, 4 Drawing Sheets

(51) Int. Cl.
  *H04L 12/935* (2013.01)
  *H04L 12/861* (2013.01)
(52) U.S. Cl.
  CPC ........ *H04L 49/103* (2013.01); *H04L 49/3036* (2013.01); *H04L 49/9036* (2013.01)
(58) Field of Classification Search
  CPC ............... H04L 49/205; H04L 49/3027; H04L 49/3036; H04L 49/90; H04L 49/9036; H04L 49/103
  See application file for complete search history.

(56) References Cited

U.S. PATENT DOCUMENTS

| | | |
|---|---|---|
| 6,594,263 B1 | 7/2003 | Martinsson et al. |
| 7,321,553 B2 | 1/2008 | Prasad et al. |
| 7,346,059 B1 | 3/2008 | Garner et al. |
| 7,738,454 B1 | 6/2010 | Panwar et al. |
| 7,821,939 B2 | 10/2010 | Decusatis et al. |
| 8,078,743 B2 | 12/2011 | Sharp et al. |
| 8,345,548 B2 | 1/2013 | Gusat et al. |
| 8,473,693 B1 | 6/2013 | Muppalaneni et al. |
| 8,576,715 B2 | 11/2013 | Bloch et al. |
| 8,630,294 B1 | 1/2014 | Keen et al. |
| 8,767,561 B2 | 7/2014 | Gnanasekaran et al. |
| 8,811,183 B1 | 8/2014 | Anand et al. |
| 8,879,396 B2 | 11/2014 | Guay et al. |
| 8,989,017 B2 | 3/2015 | Naouri |
| 8,995,265 B2 | 3/2015 | Basso et al. |
| 9,014,006 B2 | 4/2015 | Haramaty et al. |
| 9,325,619 B2 | 4/2016 | Guay et al. |
| 9,356,868 B2 | 5/2016 | Tabatabaee et al. |
| 9,426,085 B1 | 8/2016 | Anand et al. |
| 2002/0055993 A1 | 5/2002 | Shah et al. |
| 2002/0191559 A1 | 12/2002 | Chen et al. |
| 2003/0108010 A1 | 6/2003 | Kim et al. |
| 2003/0223368 A1 | 12/2003 | Allen et al. |
| 2004/0008714 A1 | 1/2004 | Jones |
| 2005/0053077 A1* | 3/2005 | Blanc ..................... H04L 47/10 370/395.72 |
| 2005/0169172 A1 | 8/2005 | Wang et al. |
| 2005/0216822 A1 | 9/2005 | Kyusojin et al. |
| 2005/0226156 A1 | 10/2005 | Keating et al. |
| 2005/0228900 A1 | 10/2005 | Stuart et al. |
| 2006/0087989 A1 | 4/2006 | Gai et al. |
| 2006/0088036 A1 | 4/2006 | De Prezzo |
| 2006/0092837 A1 | 5/2006 | Kwan et al. |
| 2006/0092845 A1 | 5/2006 | Kwan et al. |
| 2007/0097257 A1 | 5/2007 | El-Maleh et al. |
| 2007/0104102 A1 | 5/2007 | Opsasnick |
| 2007/0104211 A1 | 5/2007 | Opsasnick |
| 2007/0201499 A1 | 8/2007 | Kapoor et al. |
| 2007/0291644 A1 | 12/2007 | Roberts et al. |
| 2008/0037420 A1 | 2/2008 | Tang et al. |
| 2008/0175146 A1 | 7/2008 | Van Leekwuck et al. |
| 2008/0192764 A1 | 8/2008 | Arefi et al. |
| 2009/0207848 A1 | 8/2009 | Kwan et al. |
| 2010/0220742 A1 | 9/2010 | Brewer et al. |
| 2013/0014118 A1 | 1/2013 | Jones |
| 2013/0039178 A1 | 2/2013 | Chen et al. |
| 2013/0250757 A1 | 9/2013 | Tabatabaee et al. |
| 2013/0250762 A1 | 9/2013 | Assarpour |
| 2013/0275631 A1 | 10/2013 | Magro et al. |
| 2013/0286834 A1 | 10/2013 | Lee |
| 2013/0305250 A1 | 11/2013 | Durant |
| 2014/0133314 A1* | 5/2014 | Matthews ........... H04L 41/0672 370/244 |
| 2014/0269274 A1 | 9/2014 | Banavalikar et al. |
| 2014/0269324 A1 | 9/2014 | Tietz et al. |
| 2015/0026361 A1 | 1/2015 | Matthews et al. |
| 2015/0124611 A1 | 5/2015 | Attar et al. |
| 2015/0127797 A1 | 5/2015 | Attar et al. |
| 2015/0180782 A1 | 6/2015 | Rimmer et al. |
| 2015/0200866 A1 | 7/2015 | Pope et al. |
| 2015/0381505 A1 | 12/2015 | Sundararaman et al. |
| 2016/0135076 A1 | 5/2016 | Grinshpun et al. |
| 2017/0118108 A1 | 4/2017 | Avci et al. |
| 2017/0142020 A1 | 5/2017 | Sundararaman et al. |
| 2017/0180261 A1 | 6/2017 | Ma et al. |
| 2017/0187641 A1 | 6/2017 | Lundqvist et al. |
| 2017/0295112 A1* | 10/2017 | Cheng ................. H04L 12/6418 |
| 2018/0205653 A1 | 7/2018 | Wang et al. |

FOREIGN PATENT DOCUMENTS

| | | |
|---|---|---|
| WO | 2009107089 A2 | 9/2009 |
| WO | 2013136355 A1 | 9/2013 |
| WO | 2013180691 A1 | 12/2013 |

OTHER PUBLICATIONS

Hoeiland-Joergensen et al., "The FlowQueue-CoDel Packet Scheduler and Active Queue Management Algorithm", Internet Engineering Task Force (IETF) as draft-ietf-aqm-fq-codel-06 , 23 pages, Mar. 18, 2016.
U.S. Appl. No. 14/718,114 Office Action dated Sep. 16, 2016.
U.S. Appl. No. 14/672,357 Office Action dated Sep. 28, 2016.
Gran et al., "Congestion Management in Lossless Interconnection Networks", Submitted to the Faculty of Mathematics and Natural Sciences at the University of Oslo in partial fulfillment of the requirements for the degree Philosophiae Doctor, 156 pages, Sep. 2013.
Pfister et al., "Hot Spot Contention and Combining in Multistage Interconnect Networks", IEEE Transactions on Computers, vol. C-34, pp. 943-948, Oct. 1985.
Zhu et al.,"Congestion control for large-scale RDMA deployments", SIGCOMM'15, pp. 523-536, Aug. 17-21, 2015.
U.S. Appl. No. 14/994,164 office action dated Jul. 5, 2017.
U.S. Appl. No. 15/075,158 office action dated Aug. 24, 2017.
U.S. Appl. No. 14/967,403 office action dated Nov. 9, 2017.
U.S. Appl. No. 15/081,969 office action dated Oct. 5, 2017.
European Application # 17172494.1 search report dated Oct. 13, 2017.
European Application # 17178355 search report dated Nov. 13, 2017.
Hahne et al., "Dynamic Queue Length Thresholds for Multiple Loss Priorities", IEEE/ACM Transactions on Networking, vol. 10, No. 3, pp. 368-380, Jun. 2002.
Choudhury et al., "Dynamic Queue Length Thresholds for Shared-Memory Packet Switches", IEEE/ACM Transactions Networking, vol. 6, Issue 2 , pp. 130-140, Apr. 1998.
Gafni et al., U.S. Appl. No. 14/672,357, filed Mar. 30, 3015.
Ramakrishnan et al., "The Addition of Explicit Congestion Notification (ECN) to IP", Request for Comments 3168, Network Working Group, 63 pages, Sep. 2001.
IEEE Standard 802.1Q™—2005, "IEEE Standard for Local and metropolitan area networks Virtual Bridged Local Area Networks", 303 pages, May 19, 2006.
Infiniband TM Architecture, Specification vol. 1, Release 1.2.1, Chapter 12, pp. 657-716, Nov. 2007.
IEEE Std 802.3, Standard for Information Technology—Telecommunications and information exchange between systems—Local and metropolitan area networks—Specific requirements; Part 3: Carrier Sense Multiple Access with Collision Detection (CSMA/CD) Access Method and Physical Layer Specifications Corrigendum 1: Timing Considerations for PAUSE Operation, Annex 31B (MAC Control PAUSE operation), pp. 763-772, year 2005.
IEEE Std 802.1Qbb., IEEE Standard for Local and metropolitan area networks—"Media Access Control (MAC) Bridges and Virtual Bridged Local Area Networks—Amendment 17: Priority-based Flow Control", 40 pages, Sep. 30, 2011.
Elias et al., U.S. Appl. No. 14/718,114, filed May 21, 2015.
Gafni et al., U.S. Appl. No. 15/075,158, filed Mar. 20, 2016.
Shpiner et al., U.S. Appl. No. 14/967,403, filed Dec. 14, 2015.
Elias et al., U.S. Appl. No. 14/994,164, filed Jan. 13, 2016.
Elias et al., U.S. Appl. No. 15/081,969, filed Mar. 28, 2016.
Elias et al., U.S. Appl. No. 15/063,527, filed Mar. 8, 2016.

(56) References Cited

OTHER PUBLICATIONS

Roitshtein et al., U.S. Appl. No. 14/961,923, filed Dec. 8, 2015.
Cisco Systems, Inc., "Priority Flow Control: Build Reliable Layer 2 Infrastructure", 8 pages, 2015.
U.S. Appl. No. 15/063,527 office action dated Feb. 8, 2018.
U.S. Appl. No. 15/432,962 office action dated Nov. 2, 2018.
U.S. Appl. No. 15/469,652 office action dated Nov. 2, 2018.
U.S. Appl. No. 15/081,969 office action dated May 17, 2018.
U.S. Appl. No. 15/432,962 office action dated Apr. 26, 2018.

* cited by examiner

EFFICIENT USE OF BUFFER SPACE IN A NETWORK SWITCH

FIELD OF THE INVENTION

The present invention relates generally to packet communication networks, and particularly to buffer management in switches that are deployed in such networks.

BACKGROUND

Switches used in high-speed packet networks, such as Ethernet and InfiniBand networks, typically contain buffer memories. Packets received by the switch through one of its interfaces are stored temporarily in a buffer memory while awaiting transfer to the appropriate egress interface or possibly, in the case of multicast packets, to multiple egress interfaces. Although buffer memory may be allocated statically to each interface, many modern packet switches use a shared memory, in which buffer space is allocated dynamically to different interfaces and queues depending on traffic load and memory availability.

SUMMARY

Embodiments of the present invention that are described hereinbelow provide improved techniques for handling buffer memory in a switch and apparatus implementing such techniques.

There is therefore provided, in accordance with an embodiment of the invention, communication apparatus, including multiple ports configured to serve as ingress ports and egress ports for connection to a packet data network. A memory is coupled to the ports and configured to contain both respective input buffers allocated to the ingress ports and a shared buffer holding data packets for transmission in multiple queues via the egress ports. Control logic is configured to monitor an overall occupancy level of the memory, and when a data packet is received through an ingress port having an input buffer that is fully occupied while the overall occupancy level of the memory is below a specified maximum, to allocate additional space in the memory to the input buffer and to accept the received data packet into the additional space.

Typically, the control logic is configured, when the overall occupancy level is above the specified maximum, to discard the received data packet.

In some embodiments, the control logic is configured to apply a predefined quota to the additional space that can be allocated to each input buffer, and to discard the received data packet when the quota has been filled. Typically, the control logic is configured, upon transmission of the data packet through a designated egress port or discard of the packet, to release the input buffer to receive further data packets.

Additionally or alternatively, the control logic is configured to classify and queue the data packets received through the ingress ports into the multiple queues in the memory for transmission through the egress ports. In some embodiments, the control logic is configured, responsively to respective classifications of the data packets, to transfer some of the data packets to the shared buffer while holding others of the data packets in the input buffers until the data packets are transmitted through the egress ports. In a disclosed embodiment, the control logic is configured, upon transfer of the data packet from the input buffer to the shared buffer, to release the input buffer to receive further data packets only after verifying that a memory occupancy criterion is satisfied.

In some embodiments, the memory is configured so that the control logic can allocate any portion of the memory to the input buffers of the ingress ports.

In some embodiments, the control logic is configured to monitor the overall occupancy level of the memory by counting a first data volume of the data packets received through the ingress ports and a second data volume of the data packets transmitted through the egress ports. In a disclosed embodiment, the control logic is configured to monitor respective fill levels of the input buffers by incrementing an input buffer count when a given data packet is written from the ingress port to a location in the memory, and decrementing the input buffer count when the given data packet is transferred to the egress ports or to the shared buffer and the additional space allocated in the memory to the input buffer is no longer occupied, and sufficient space is available in the memory to reduce the input buffer count.

There is also provided, in accordance with an embodiment of the invention, a method for communication, which includes receiving data packets from a packet data network through an ingress port of a network element having multiple ports configured to serve as ingress ports and egress ports. The data packets are transferred from the ingress port to memory in the network element, which is configured to contain both respective input buffers allocated to the ingress ports and a shared buffer holding data packets for transmission in multiple queues via the egress ports. An overall occupancy level of the memory is monitored. When a data packet is received through an ingress port having an input buffer that is fully occupied while the overall occupancy level of the memory is below a specified maximum, additional space in the memory is allocated to the input buffer, and the received data packet is accepted into the additional space.

The present invention will be more fully understood from the following detailed description of the embodiments thereof, taken together with the drawings in which:

DETAILED DESCRIPTION OF EMBODIMENTS

Figure 1:
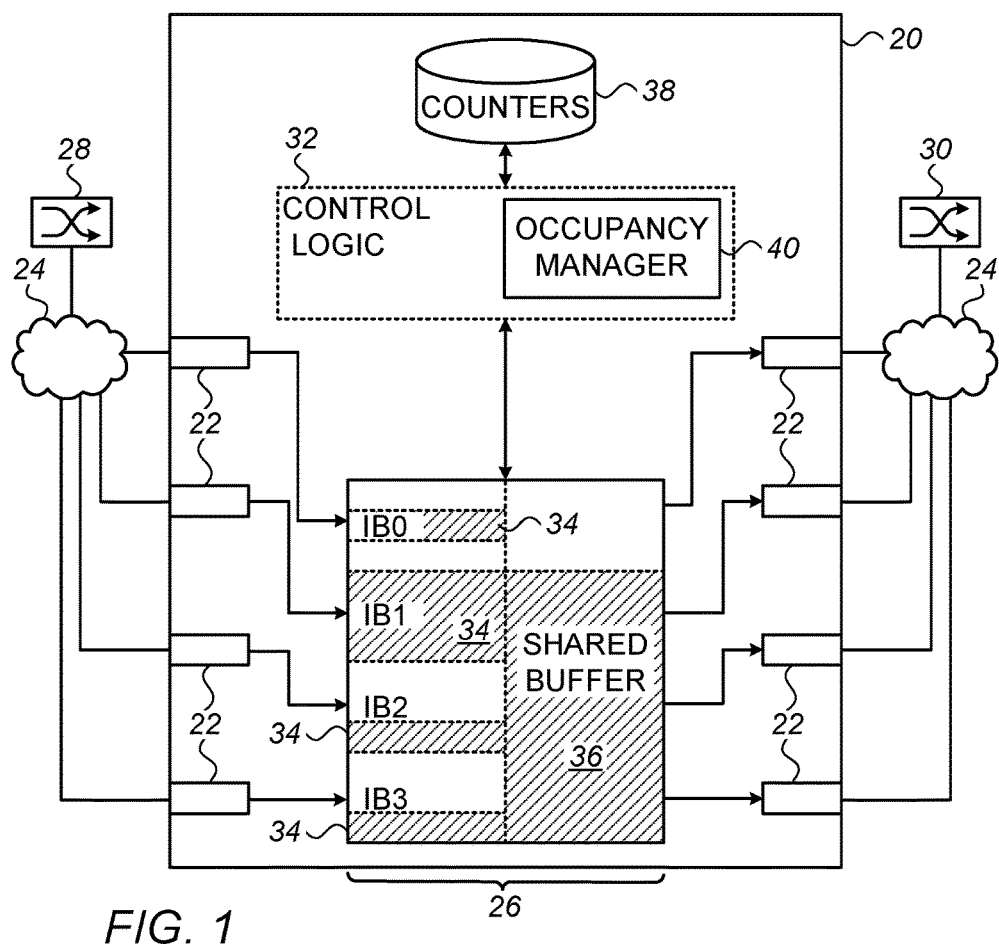
FIG. 1 is a block diagram that schematically illustrates a switch with a shared memory, in accordance with an embodiment of the invention.

Even in network elements, such as switches, that have a shared memory, it is still common practice to allocate a respective input buffer to each ingress port. This input buffer may include a separate physical memory array for each port. Additionally or alternatively, the input buffer may comprise a part of a memory array that also serves as the shared buffer. The latter sort of arrangement is described, for example, in U.S. patent application Ser. No. 14/994,164, filed Jan. 13, 2016, whose disclosure is incorporated herein by reference.

Management of the input buffer depends on whether or not the ingress ports apply flow control to limit the rate at which they receive packets in order to avoid packet loss. In Ethernet networks, for example, when the rate of incoming packets from a source is higher than a switch can accommodate, the switch can send a link-level flow-control message, known as PAUSE frame, to the source of the packets to instruct the source to stop transmitting packets. The switch typically reserves an input buffer, known as the lossless headroom (or simply "headroom"), to admit packets that may arrive after the flow-control message is sent.

Even in networks that operate without flow control, however, minimizing packet loss is desirable in order to avoid degradation of quality of service and loss of bandwidth due to frequent retransmission requests. The input buffers play an important role in this regard. For example, it is desirable that the input buffer that is allocated to each ingress port be large enough to hold packets that may accumulate due to delays in packet classification and forwarding by the control logic within the switch. An input buffer that is too small will force the ingress port to drop packets when this sort of delay occurs. On the other hand, fixed allocation of large input buffers can come at the expense of the shared buffer and is an inefficient use of the limited memory resources in the switch.

Embodiments of the present invention that are described herein optimize input buffering in a network element by enabling flexible allocation of memory space to the input buffers. The disclosed embodiments are directed to a communication apparatus, such as a switch, in which a memory contains both respective input buffers allocated to ingress ports of the switch and a shared buffer holding data packets for transmission in multiple queues via egress ports. (Typically, although not necessarily, all of the switch ports are configured to serve as both ingress and egress ports.) Control logic in the switch monitors the overall occupancy level of the memory, in addition to monitoring the specific fill levels of the input buffers and the shared buffer. When a data packet is received through an ingress port having an input buffer that is fully occupied, the control logic is able to allocate additional space in the memory to the input buffer as long as the overall occupancy level of the memory is below a predefined maximum.

The switch accepts the received data packet into this additional memory space and thereby avoids packet loss. The maximum overall occupancy level of the memory is typically chosen so that in most cases, the control logic will be able to expand the input buffers when needed, but only to the extent that this expansion is unlikely to cause packets to be dropped from the shared buffer and to impinge on the input buffer allocations of the other ports. Therefore, when the overall occupancy level is above the predefined maximum, the control logic will discard the received data packet, rather than expanding the input buffer any further. By the same token, the control logic typically applies a certain quota to the additional space that can be allocated to each input buffer, and will discard the received data packet when the quota has been filled.

FIG. 1 is a block diagram that schematically illustrates a network switch 20 with a shared memory 26, in accordance with an embodiment of the invention. Switch 20 comprises multiple ports 22, which are connected via links of a packet data network 24 to communicate with peer devices 28, 30, . . . . Memory 26 in switch 20 receives packets from and passes packets to ports 22, under the direction of control logic 32. (Although memory 26 is shown in FIG. 1 as a single physical block, in practice memory 26 may comprise multiple physical memory arrays, which are managed together by control logic 32 as a single logical resource.) For the sake of visual clarity, ports 22 at the left side of switch 20 are shown in FIG. 1 as ingress ports, while ports 22 at the right side of the switch are shown as egress ports. In practice, however, all of the switch ports are typically configured to operate as both ingress and egress ports, as noted above.

Within memory array 26, control logic 32 allocates a respective volume of memory to serve as an input buffer 34 (marked IB0, IB1, IB2, . . . ) for each ingress port 22, in order to hold packets received from network 24 through the port. Another portion of array 26 is allocated as a shared buffer 36, holding data packets for transmission in multiple queues via egress ports 22. Control logic 32 is able to adjust the volumes of the different input buffers 34, as well as the overall cumulative volume of input buffers 34 relative to shared buffer 36. These adjustments may be in the form of static pre-allocations, with additional allocations as needed, depending upon the relative fill levels of the different input buffers (indicated schematically by the shading within array 26 in FIG. 1), as described further hereinbelow. In some embodiments, memory 26 is configured in such a way that control logic 32 can allocate any physical portion of the memory array to input buffers 34, in a manner similar to the allocation of headroom that is described in the above-mentioned U.S. patent application Ser. No. 14/994,164.

For convenience in visualizing the division of functions within memory 26, input buffers 34 and shared buffer 36 are marked in FIG. 1 as separate physical regions. In some embodiments, however, control logic 32 implements a management scheme in which these boundaries are logical, rather than physical, and can shift dynamically under the control of an occupancy manager 40 and other functions of control logic 32. In such embodiments, for example, control logic 32 can transfer packets from input buffers 34 to shared buffer 36 without actually copying the packets from one memory location to another. Rather, occupancy manager 40, together with input and shared buffer management functions in control logic 32, simply increments and decrements corresponding counters, which are held in a count memory 38 within switch 20, in order to keep track of the actual occupancy levels of the various memory allocations. Thus, the physical address of a given packet in memory 26 may initially be a part of one of input buffers 34 and may then shift to be a part of shared buffer 36 and back again to the input buffer after the packet is transmitted out through an egress port.

Alternatively, the principles of the present embodiments may be applied, mutatis mutandis, in switches and other network elements in which input buffers 34 are, at least in part, physically separate from shared buffer 36, so that packet data are physically copied when transferred from one buffer to another.

Although control logic 32 is shown in FIG. 1, for the sake of simplicity, as a single, centralized functional block, the functions of this logic may be distributed among a central controller and individual port logic units that are associated with ports 22. The functions of control logic 32 may be implemented in hard-wired or programmable logic circuits or in one or more programmable processing units, driven by software or firmware, or in a combination of such elements.

Figure 2:
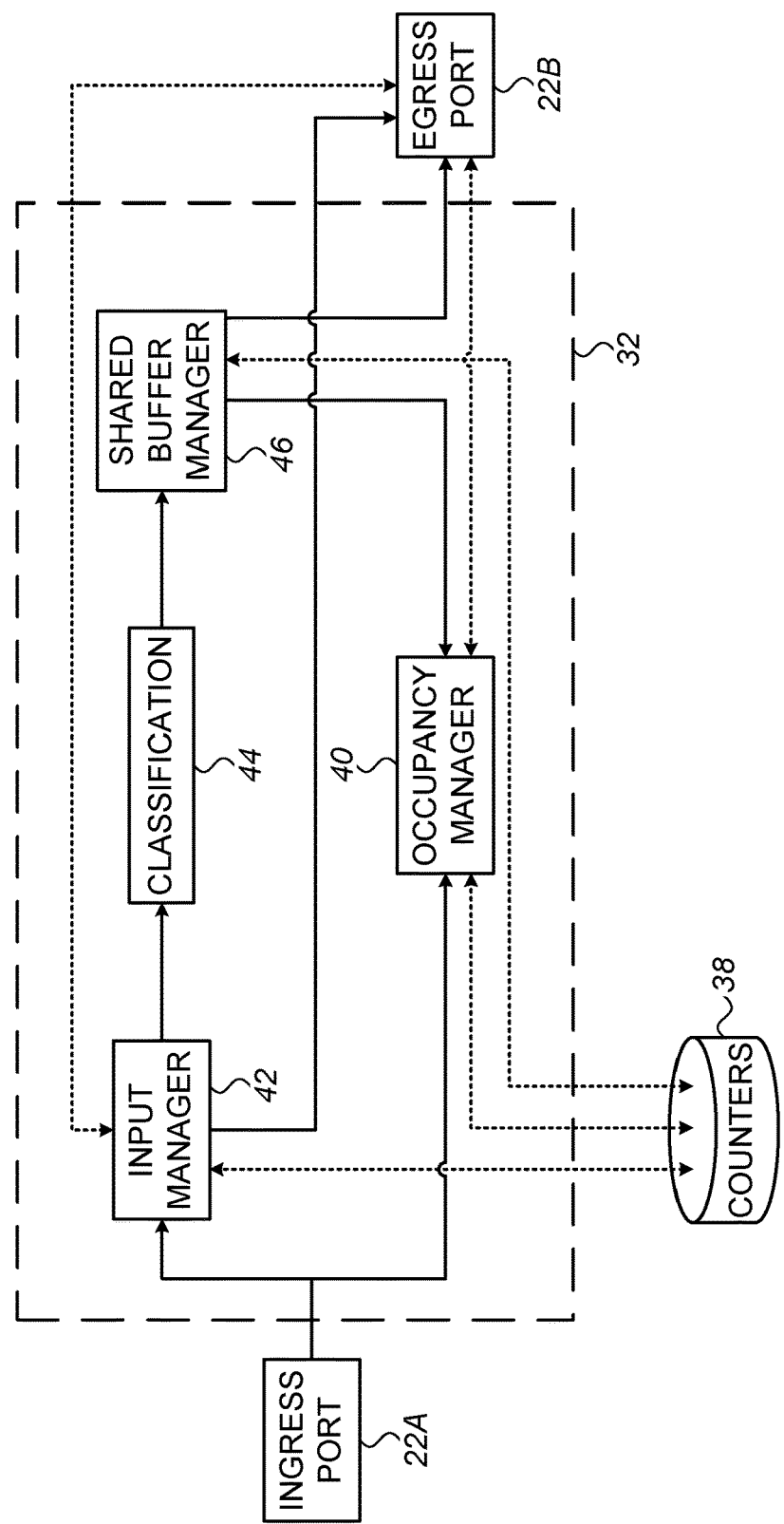
FIG. 2 is a block diagram that schematically shows details of control logic in a switch, in accordance with an embodiment of the invention.

FIG. 2 is a block diagram that schematically shows details of control logic 32 in switch 20, in accordance with an embodiment of the invention. For the sake of clarity and concreteness, this figure illustrates one possible implementation of logic 32, but other implementations will be apparent to those skilled in the art after reading the present description and are considered to be within the scope of the present invention. Although the elements of logic 32 are shown in FIG. 2 as separate functional components, in practice these components can be implemented together in custom or programmable hardware logic within a single chip or chip set.

Upon receiving an incoming packet via an ingress port 22A (such as one of ports 22 in FIG. 1), an input manager 42 attempts to place the packet in the input buffer 34 in memory 26 that is allocated to the ingress port. As explained earlier, input manager 42 tracks the occupancy of input buffer 34 by incrementing a counter in count memory 38 each time a packet is received and written to input port 34, and decrementing the count when packets are passed to shared buffer 36 or to an egress port 22B. When this count reaches a certain limit, input manager 42 will refuse to accept the incoming packet.

At the same time, however, occupancy manager 40 maintains a count in count memory 38 of the total occupancy of memory 26, for example by counting the data volume of packets received through the ingress ports of switch 20 and the data volume of the packets transmitted through the egress ports. This count, in other words, is incremented each time a packet is written to memory 26 from any ingress port 22A and is decremented whenever space in memory 26 (whether allocated to input buffers 34 or shared buffer 36) is freed, for example due to transmission of packets through any egress port 22B or discard of a packet. Thus, even when the count of data in input buffer 34 has reached its limit, occupancy manager 40 can allocate additional space in memory 26 to input buffer 34 in order to accept the packet. Occupancy manager 40 will typically make this allocation as long as the total occupancy count is below a predefined maximum, and the additional allocation made so far to input buffer 34 of this ingress interface 22A has not reached a certain predefined quota.

Upon arrival of an incoming packet in input buffer 34 (whether through input manager 42 or in additional space allocated by occupancy manager), classification logic 44 classifies and queues the packet into one of multiple queues in memory 26 for transmission through one or more egress ports 22B. For this purpose, classification logic 44 typically parses the packet header and generates one or more descriptors for further handling and generation of forwarding instructions. Based on the descriptors, processor 56 chooses the egress port 22B (or ports) through which the packet is to be transmitted. The descriptor may also indicate the quality of service (QoS) to be applied to the packet, i.e., the level of priority for transmission, and any applicable instructions for modification of the packet header. Classification logic places the descriptors in the appropriate transmit queues, to await transmission via the designated egress ports 22B. Typically, control logic 32 maintains a dedicated transmit queue for each egress port 22B or multiple transmit queues per egress port, one for each priority level.

Upon queuing a descriptor for a given packet, classification logic 44 notifies a shared buffer manager that the corresponding packet has been queued. Depending upon the packet classification, shared buffer manager 46 decides whether to transfer the packet from input buffer 34 to shared buffer 36. In making this decision, shared buffer manager 46 typically considers criteria such as the level of priority of the packet and/or other features of the transmit queue to which the packet is assigned and/or the input buffer in which it is held. Data packets that are not admitted to shared buffer 36 will typically remain in their assigned input buffers 34 until they reach the heads of their respective queues and are transmitted out through egress port 22B.

Like input manager 42, shared buffer manager 46 tracks the occupancy level of shared buffer 36 by incrementing a data count in count memory 38 when a packet is transferred from input buffer 34 and decrementing the data count when the packet is transmitted out through egress port 22B. Upon accepting a packet from input buffer 34, shared buffer manager 46 notifies occupancy manager 40 that the corresponding space in the input buffer can be freed. Before doing so, however, occupancy manager 40 checks whether it has allocated any additional space to this input buffer, and if so, verifies that the conditions have been met to release space in the input buffer. For example, occupancy manager 40 can check that the overall occupancy level of memory 26 is below the predefined maximum and/or that the additional input buffer space allocated to ingress port 22A is no longer occupied. When these conditions are met, occupancy manager 40 releases the corresponding space in input buffer 34 or signals input manager 42 to do so, for example by decrementing the value of the corresponding input buffer counter in count memory 38.

Upon the transmission of the packet to network 24, egress port 22B (or another packet transmission component of control logic 32) signals occupancy manager 40. In response to this notification, occupancy manager 40 decrements its count of memory occupancy. Depending upon whether the packet was transmitted to egress port 22B from input buffer 34 or from shared buffer 36, input manager 42 or shared buffer manager 46 releases the buffer space so that the location in memory 26 can be overwritten, and the corresponding allocation is then free to accept further packets.

Figure 3:
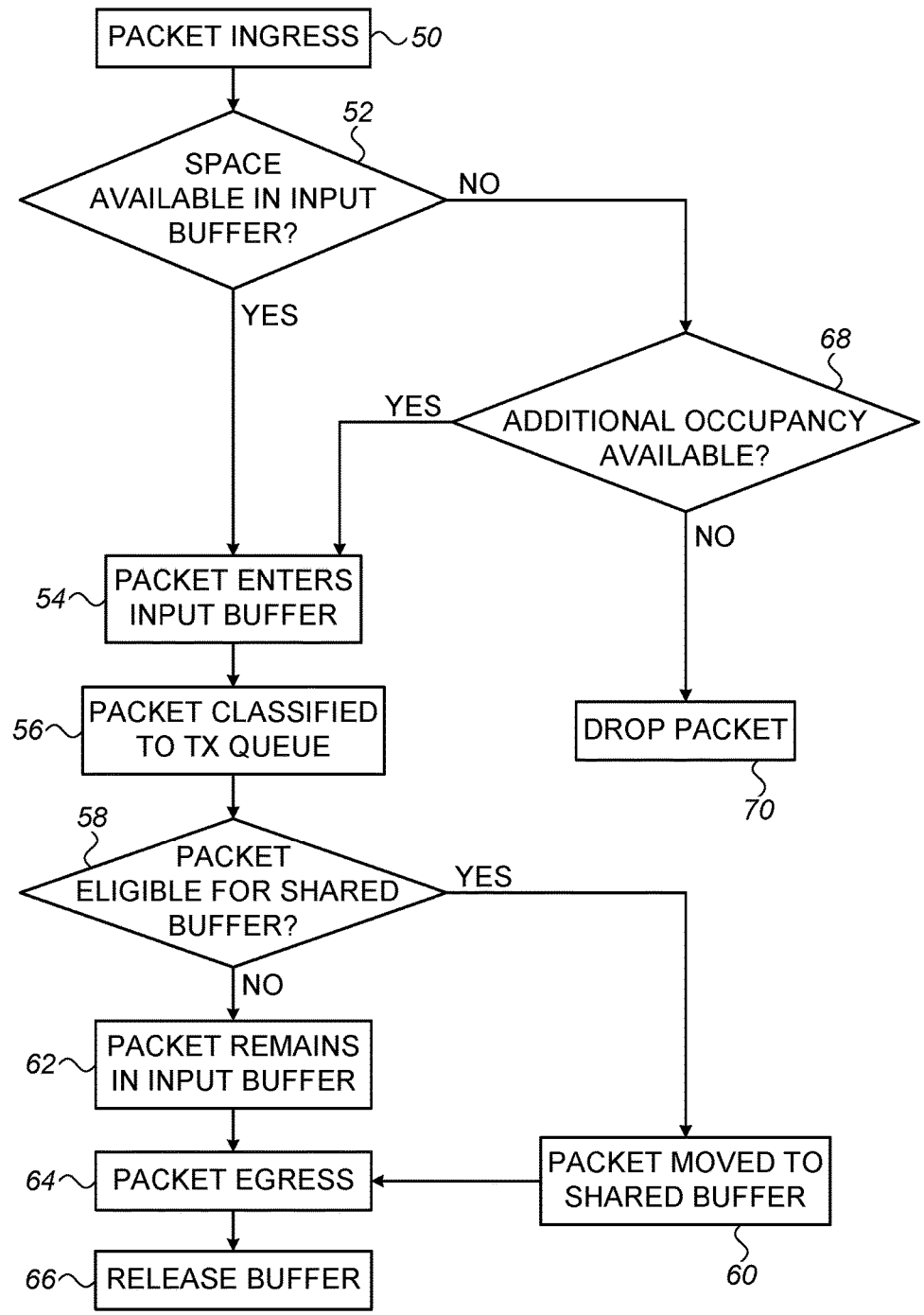
FIG. 3 is a flow chart that schematically illustrates a method for management of buffer space in a switch, in accordance with an embodiment of the invention.

FIG. 3 is a flow chart that schematically illustrates a method for management of buffer space in switch 20, in accordance with an embodiment of the invention. This memory accounting and management process typically takes place for multiple different packets in parallel at any given time, entering and exiting switch through different ingress and egress ports and accordingly using different, respective buffer allocations. The method is described, for the sake of clarity, with reference to the specific implementation that is shown in FIG. 2, but alternative implementations will be apparent to those skilled in the art and are considered to be within the scope of the present invention.

The method of FIG. 3 is initiated when switch 20 receives an incoming packet through ingress port 22A, at a packet ingress step 50. Input manager 42 checks whether there is space available for the packet in the corresponding input buffer 34, at an input buffer checking step 52. For this purpose, for example, the input manager examines whether the corresponding data count in count memory 38 has reached the data volume allocated to this input buffer. If there is space available, ingress port 22A is allowed to write the packet to input buffer 34, at an input buffer admission step 54. Classification logic 44 processes the packet header in order to classify the packet and assign it to the appropriate transmit queue, at a packet queuing step 56.

Shared buffer manager 46 checks whether the packet is eligible for transfer to shared buffer 36, at an eligibility checking step 58. As noted earlier, this decision typically depends on the packet type and priority, as well as the availability of space in the shared buffer. If the packet is eligible for transfer, shared buffer manager 46 moves the packet to shared buffer 36, at a buffer transfer step 60. Although this transfer may involve physical copying of the packet from one location to another in memory 26, in some embodiments it is carried out simply by incrementing the shared buffer counter in count memory 38, without physically moving the packet data. The corresponding space can be freed from input buffer 34 as long as the appropriate conditions are met, as explained further hereinbelow with reference to FIG. 4. Otherwise, if the packet is not eligible for transfer to shared buffer 36, it remains in input buffer 34, at a packet hold step 62.

When the packet reaches the head of its transmit queue, control logic 32 passes the packet to egress port 22B, at a packet transmission step 64. In response to transmission of the packet, the components of control logic 32 release the corresponding space in shared buffer 36 or input buffer 34, at a buffer release step 66.

Returning now to step 52, when input manager 42 finds that it does not have sufficient space remaining in input buffer 34 to accept the packet, occupancy manager 40 checks whether there is additional space available in memory 26 to accept the packet, at an occupancy checking step 68. The conditions for allocating additional space by occupancy manager 40 may vary depending on system and network requirements. In the present embodiment, as explained above, occupancy manager 40 will allocate additional space in memory 26 to input buffer 34 when the overall occupancy level of memory 26 (as indicated by the count maintained in count memory 38) is below a predefined maximum, and as long the additional space allocated to this input buffer does not exceed a predefined quota. For example, if the system operator has allocated a certain original volume of memory to this input buffer, occupancy manager may allocate up to a certain additional percentage of the original volume (such as 20%). The quota is typically chosen to be large enough to forestall packet loss in case of processing delays by control logic 32, without significantly increasing the probability that packets entering switch 20 through other ports 22 will have to be dropped due to buffer overflow. The quality of service (QoS) level of the packet can also be a factor in deciding whether to allocate additional space for it.

If occupancy manager 40 is able to allocate additional buffer space to the incoming packet at step 68, the packet enters the input buffer at step 54 and is processed by classification logic 44 as described above. Otherwise, if additional buffer space is not available (either because memory 26 is close to being fully occupied, or because input buffer 34 has reached its quota), control logic 32 drops the packet, at a packet discard step 70.

Figure 4:
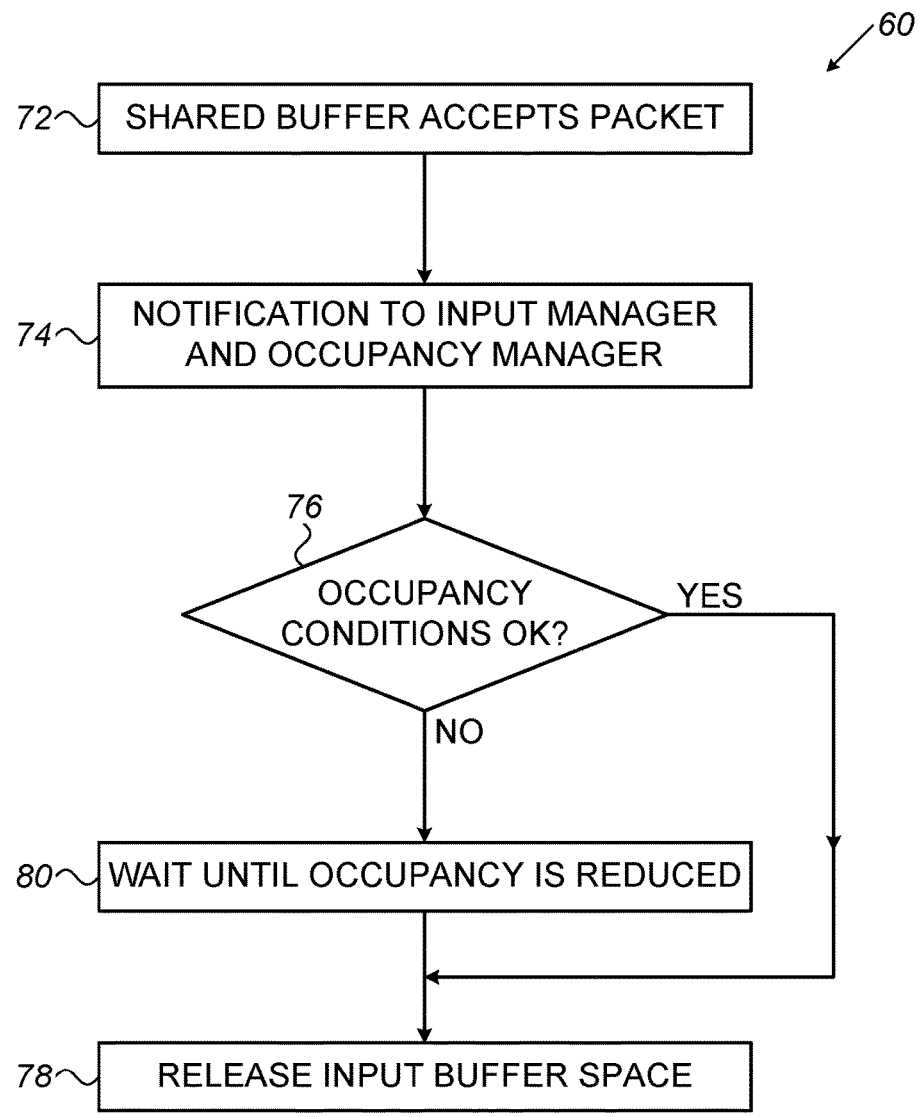
FIG. 4 is a flow chart that schematically illustrates a method for release of buffer space following processing of a data packet in a switch, in accordance with an embodiment of the invention.

FIG. 4 is a flow chart that schematically illustrates a method for release of buffer space following processing of a data packet in switch 20, in accordance with an embodiment of the invention. This method is carried out, as explained above, when shared buffer manager 46 accepts a packet into shared buffer 36 from input buffer 34 at step 60 and is explained further hereinbelow with reference to this step. A similar process takes place when a packet exits switch 20 at steps 64 and 66.

The method of FIG. 4 begins, in the present example, when shared buffer manager 46 decides to accept a packet from input buffer 34 into shared buffer 36, at a packet acceptance step 72. Shared buffer manager 46 notifies occupancy manager 40 and input manager 42 of its decision, at a notification step 74. Occupancy manager 40 checks at this stage whether the applicable conditions are met for releasing the buffer space to input manager 42, at a release checking step 76. As noted earlier, the release of space to the input buffer is typically conditioned on verifying that the overall occupancy level of memory 26 is below the predefined maximum. Occupancy manager 40 may also verify that the additional space allocated to input buffer 34 is within a predefined quota. Other factors, such as the specific occupancy level of the shared buffer and the QoS level of the packet (for example, whether the packet belongs to a lossy or a lossless traffic class), may also be taken into account.

When the applicable conditions are met at step 76, occupancy manager 40 releases the input buffer space that has now been freed by transfer of a packet to shared buffer 36, or signals input manager 42 to do so, at an input buffer release step 78. In the present example, this step is carried out by decrementing the corresponding input buffer counter in count memory 38 by an amount corresponding to the size of the packet that has been transferred. Alternatively, the transfer at step 78, and the decrement of the buffer counter, may be in an amount corresponding to multiple packets or a fraction of a packet. Otherwise, when the conditions are not met for freeing space in the input buffer, control logic 32 delays releasing the input buffer space, at a release deferral step 80. Occupancy manager 40 will allow the input buffer space to be released at step 78 only after the applicable conditions have been met, typically following transmission of additional packets from memory 26.

Although the embodiments described above relate specifically, for the sake of clarity and completeness, to network switches, the principles of the present invention may similarly be applied to network switching elements of other sorts, such as bridges and routers, as well as to other sorts of network elements having multiple inputs and outputs, such as suitable types of network interface controllers. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Communication apparatus, comprising:
   multiple ports configured to serve as ingress ports and egress ports for connection to a packet data network;
   a memory, coupled to the ports and configured to contain both respective input buffers allocated to the ingress ports and a shared buffer holding data packets for transmission in multiple transmit queues via the egress ports; and
   control logic, which is configured to monitor an overall occupancy level of the memory, and when a data packet is received through an ingress port having an input buffer that is fully occupied while the overall occupancy level of the memory is below a specified maximum, to flexibly allocate additional space in the memory to the input buffer by shifting an allocation in the memory from the shared buffer holding the data packets in the multiple transmit queues to the input buffer, whereby a part of the memory that was a part of the shared buffer holding the data packets in the transmit queues is shifted to be a part of the input buffer, and to accept the received data packet into the additional space.

2. The apparatus according to claim 1, wherein the control logic is configured, when the overall occupancy level is above the specified maximum, to discard the received data packet.

3. The apparatus according to claim 1, wherein the control logic is configured to apply a predefined quota to the additional space that can be allocated to each input buffer, and to discard the received data packet when the quota has been filled.

4. The apparatus according to claim 3, wherein the control logic is configured, upon transmission of the data packet through a designated egress port or discard of the packet, to release the input buffer to receive further data packets.

5. The apparatus according to claim 1, wherein the control logic is configured to classify and queue the data packets received through the ingress ports into the multiple queues in the memory for transmission through the egress ports.

6. The apparatus according to claim 5, wherein the control logic is configured, responsively to respective classifications of the data packets, to transfer some of the data packets to the shared buffer while holding others of the data packets in the input buffers until the data packets are transmitted through the egress ports.

7. The apparatus according to claim 6, wherein the control logic is configured, upon transfer of the data packet from the input buffer to the shared buffer, to release the input buffer to receive further data packets only after verifying that a memory occupancy criterion is satisfied.

8. The apparatus according to claim 1, wherein the memory is configured so that the control logic can allocate any portion of the memory to the input buffers of the ingress ports.

9. The apparatus according to claim 1, wherein the control logic is configured to monitor the overall occupancy level of the memory by counting a first data volume of the data packets received through the ingress ports and a second data volume of the data packets transmitted through the egress ports.

10. The apparatus according to claim 9, wherein the control logic is configured to monitor respective fill levels of the input buffers by incrementing an input buffer count when a given data packet is written from the ingress port to a location in the memory, and decrementing the input buffer count when the given data packet is transferred to the egress ports or to the shared buffer and the additional space allocated in the memory to the input buffer is no longer occupied, and sufficient space is available in the memory to reduce the input buffer count.

11. A method for communication, comprising:
receiving data packets from a packet data network through an ingress port of a network element having multiple ports configured to serve as ingress ports and egress ports;
transferring the data packets from the ingress port to memory in the network element, which is configured to contain both respective input buffers allocated to the ingress ports and a shared buffer holding data packets for transmission in multiple transmit queues via the egress ports;
monitoring an overall occupancy level of the memory; and
when a data packet is received through an ingress port having an input buffer that is fully occupied while the overall occupancy level of the memory is below a specified maximum, flexibly allocating additional space in the memory to the input buffer by shifting an allocation in the memory from the shared buffer holding the data packets in the multiple transmit queues to the input buffer, whereby a part of the memory that was a part of the shared buffer holding the data packets in the transmit queues is shifted to be a part of the input buffer, and accepting the received data packet into the additional space.

12. The method according to claim 11, and comprising, when the overall occupancy level is above the specified maximum, discarding the received data packet.

13. The method according to claim 11, wherein allocating the additional space comprises applying a predefined quota to the additional space that can be allocated to each input buffer, and discarding the received data packet when the quota has been filled.

14. The method according to claim 13, and comprising, upon transmission of the data packet through a designated egress port or discard of the packet, releasing the input buffer to receive further data packets.

15. The method according to claim 11, and comprising classifying and queuing the data packets received through the ingress ports into the multiple queues in the memory for transmission through the egress ports.

16. The method according to claim 15, wherein transferring the data packets comprises transferring some of the data packets, responsively to respective classifications of the data packets, to the shared buffer while holding others of the data packets in the input buffers until the data packets are transmitted through the egress ports.

17. The method according to claim 16, and comprising, upon transfer of the data packet from the input buffer to the shared buffer, releasing the input buffer to receive further data packets only after verifying that a memory occupancy criterion is satisfied.

18. The method according to claim 11, wherein the memory is configured so that any portion of the memory can be allocated to the input buffers of the ingress ports.

19. The method according to claim 11, wherein monitoring the overall occupancy level of the memory comprises counting a first data volume of the data packets received through the ingress ports and a second data volume of the data packets transmitted through the egress ports.

20. The method according to claim 19, and comprising monitoring respective fill levels of the input buffers by incrementing an input buffer count when a given data packet is written from the ingress port to a location in the memory, and decrementing the input buffer count when the given data packet is transferred to the egress ports or to the shared buffer and the additional space allocated in the memory to the input buffer is no longer occupied, and sufficient space is available in the memory to reduce the input buffer count.

* * * * *